United States Patent [19]  [11] 3,910,921
Esanu  [45] Oct. 7, 1975

[54] PAPAVERINE MONOPYRIDOXAL PHOSPHATE

[75] Inventor: André Esanu, Paris, France

[73] Assignee: Societe d'Etudes de Produits Chimiques, Issy-les-Moulineaux, France

[22] Filed: Mar. 6, 1973

[21] Appl. No.: 338,604

Related U.S. Application Data

[63] Continuation-in-part of Ser. No. 91,550, Nov. 20, 1970, abandoned.

[30] Foreign Application Priority Data

Jan. 8, 1970 France .................................. 70.919

[52] U.S. Cl. ............ 260/286 R; 260/297.5; 424/258
[51] Int. Cl.² ....................................... C07D 215/58
[58] Field of Search ........ 260/297 P, 297 V, 286 R, 260/289 R, 289 A

[56] References Cited
OTHER PUBLICATIONS

"Dictionary of Organic Compounds," Oxford University Press, 1965.

Primary Examiner—Donald G. Daus
Assistant Examiner—David E. Wheeler
Attorney, Agent, or Firm—Eyre, Mann & Lucas

[57] ABSTRACT

An addition complex of Papaverine, namely Papaverine monopyridoxal phosphate, is described, as well as its preparation. The compound has utility in the fields of neurology, cardiology and arterial pathology.

1 Claim, No Drawings

PAPAVERINE MONOPYRIDOXAL PHOSPHATE

This application is a continuation-in-part of Ser. No. 91,550, filed Nov. 20, 1970, now abandoned.

This invention relates to a new compound which is an addition complex of papaverine, and which presents an interest in the medical field.

The application discloses an invention providing the compound papaverine monopyridoxal phosphate, which has the formula:

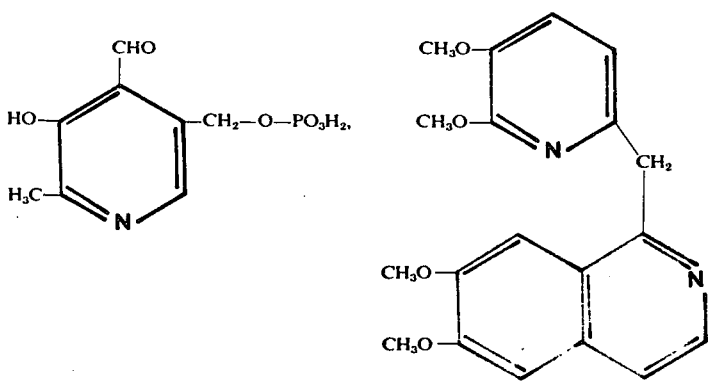

The new compound is a yellow product melting at about 125°C. Its formula is $C_{28}H_{31}O_{10}N_2P$ and its molecular weight is 586.54.

The compound of this invention can be obtained by the reaction of 5-pyridoxal phosphoric acid with a suspension of papaverine in water. The reagents are preferably used in equimolar quantities. The following example illustrates the invention.

EXAMPLE 33.9 g (0.1 mole) of papaverine were added under stirring to 0.5 liter of water in a 2 liter flask. The resulting suspension was heated to boiling for some minutes, under stirring, then cooled to about 70°C. To the suspension there were added 24.7 g (0.1 mole) of 5-pyridoxal phosphoric acid. The stirring was continued until the particles of papaverine in suspension had dissolved and the solution thus obtained was filtered, then cooled, and the complex precipitated by lyophilisation.

There were obtained 54 g of papaverine monopyridoxal phosphate melting at about 125°C. The analytical values were as follows:

|  | C | H | O | N | P |
|---|---|---|---|---|---|
| Experimental | 57.12 | 5.74 | 26.81 | 4.91 | 5.42 |
| Theoretical | (57.34) | (5.33) | (27.28) | (4.77) | (5.28) |

The compound of this invention has a very high water solubility (0.1 g per 0.1 ml) which is especially interesting when compared, for instance, with the water solubility of papaverine hydrochloride (0.1 g per 4ml) or pyridoxal phosphate (water insoluble). This high solubility is a favorable factor for use of the compound in the medical field.

The toxicity is low (LD 50 on mice, per os is 0.5 g/kg). Moreover the in vitro activities of the compound of the invention, on one hand, and of the association of pyridoxal phosphate + papaverine hydrochloride, on the other hand, show more favorable values, for instance, in the test of the spasmolytic action on isolated ileon of guinea pig. A peripheral vasodilator action has been noted in the test of the isolated perfused ear of rabbit with more favorable results with papaverine monopyridoxal phosphate than with papaverine hydrochloride.

In vivo experimentation undertaken on dogs with the new compound has shown better action in the increase of the coronary and femoral blood flows, compared with the action of the mixture of pyridoxal phosphate + papaverine hydrochloride.

The results obtained in the previously mentioned pharmacological experimentation have led to develop a drug comprising, as an essential ingredient, this new compound for use in human therapy in the field of neurology, cardiology and arterial pathology.

This drug can be presented in any form suitable for human therapy and the retained forms were gelatin capsules dosed at 0.250 g for oral administration and injectionable solution in phials containing 0.100 g per unit for intraveinous, intraarterial or intramuscular administration.

Clinical experimentation on patients (about 100 cases) suffering from cranial traumatisms, cerebral vascular deficiencies, thrombosis, sequelae of hemiplegia, Parkinson's disease, infarctus, angor, arterial hypertension, cardiovascular diseases or affections related with the same, have given very favorable results, i.e., better or faster recovery, without any noticeable side effects.

The daily doses to be administered are in the range of 0.250 g to 3 g per os or 0.1 g to 1.2 g by injection. More usual daily doses are 0.5 g to 1.5 g per os or 0.1 g to 0.6 g by injection.

The advantages of the present invention, as well as certain changes and modifications of the disclosed embodiment thereof, will be readily apparent to those skilled in the art. It is the Applicant's intention to cover all those changes and modifications which could be made to the embodiment of the invention herein chosen for the purposes of the disclosure without departing from the spirit and scope of the invention.

What is claimed is:

1. Papaverine monopyridoxal phosphate.

* * * * *

UNITED STATES PATENT OFFICE
CERTIFICATE OF CORRECTION

PATENT NO. : 3,910,921
DATED : October 7, 1975
INVENTOR(S) : Andre Esanu

It is certified that error appears in the above-identified patent and that said Letters Patent are hereby corrected as shown below:

Foreign Application Priority Data should read --Jan.8,1970 Gt.Britain 70.919--

Col. 1, Lines 10 to 27: The formula should read

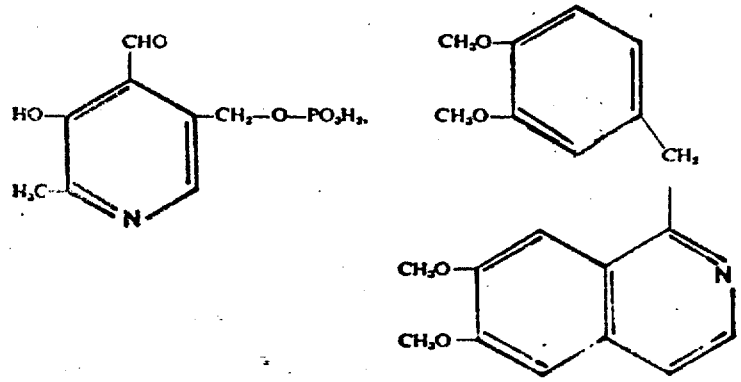

Signed and Sealed this twenty-fourth Day of February 1976

[SEAL]

Attest:

RUTH C. MASON
Attesting Officer

C. MARSHALL DANN
Commissioner of Patents and Trademarks